UNITED STATES PATENT OFFICE.

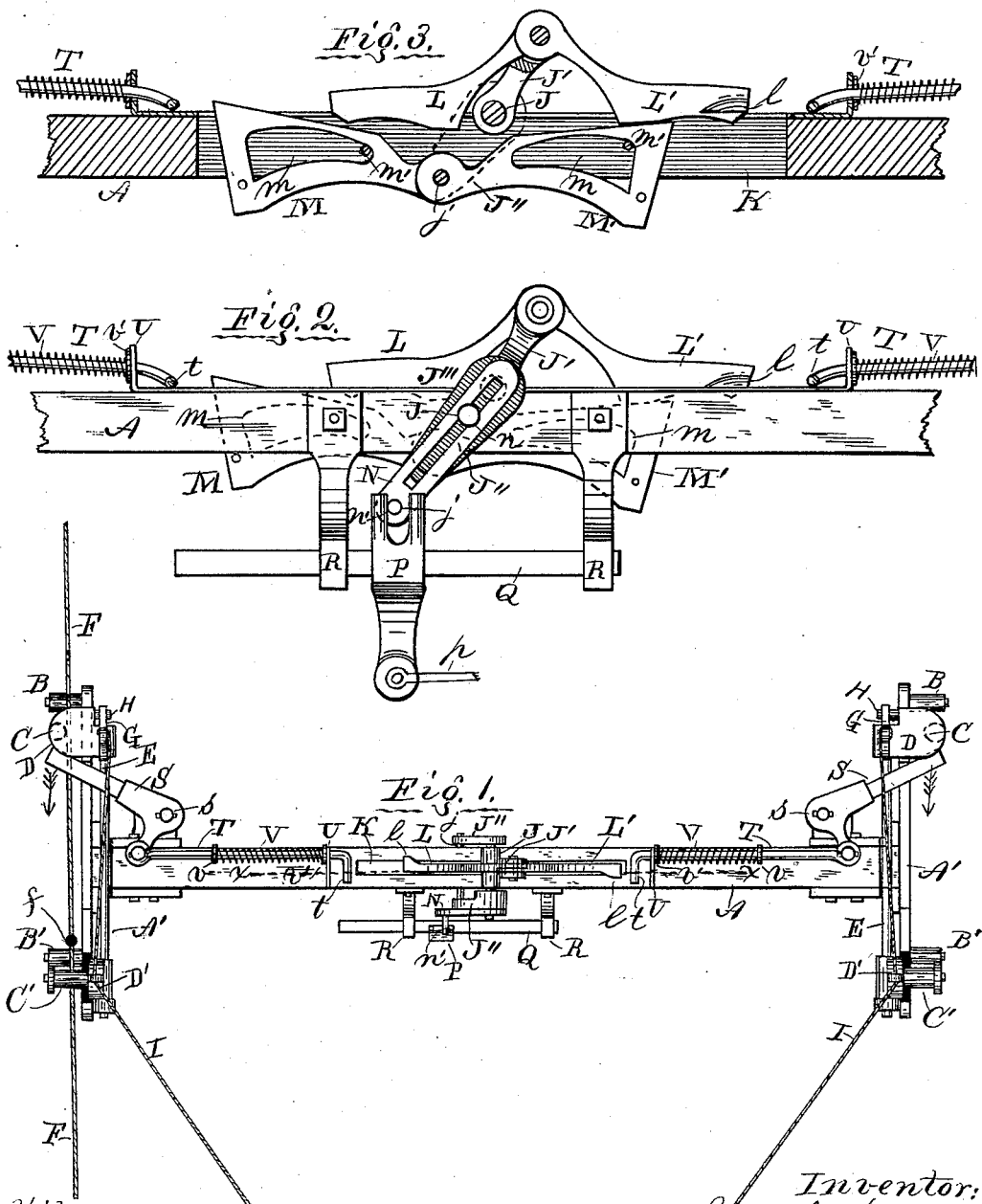

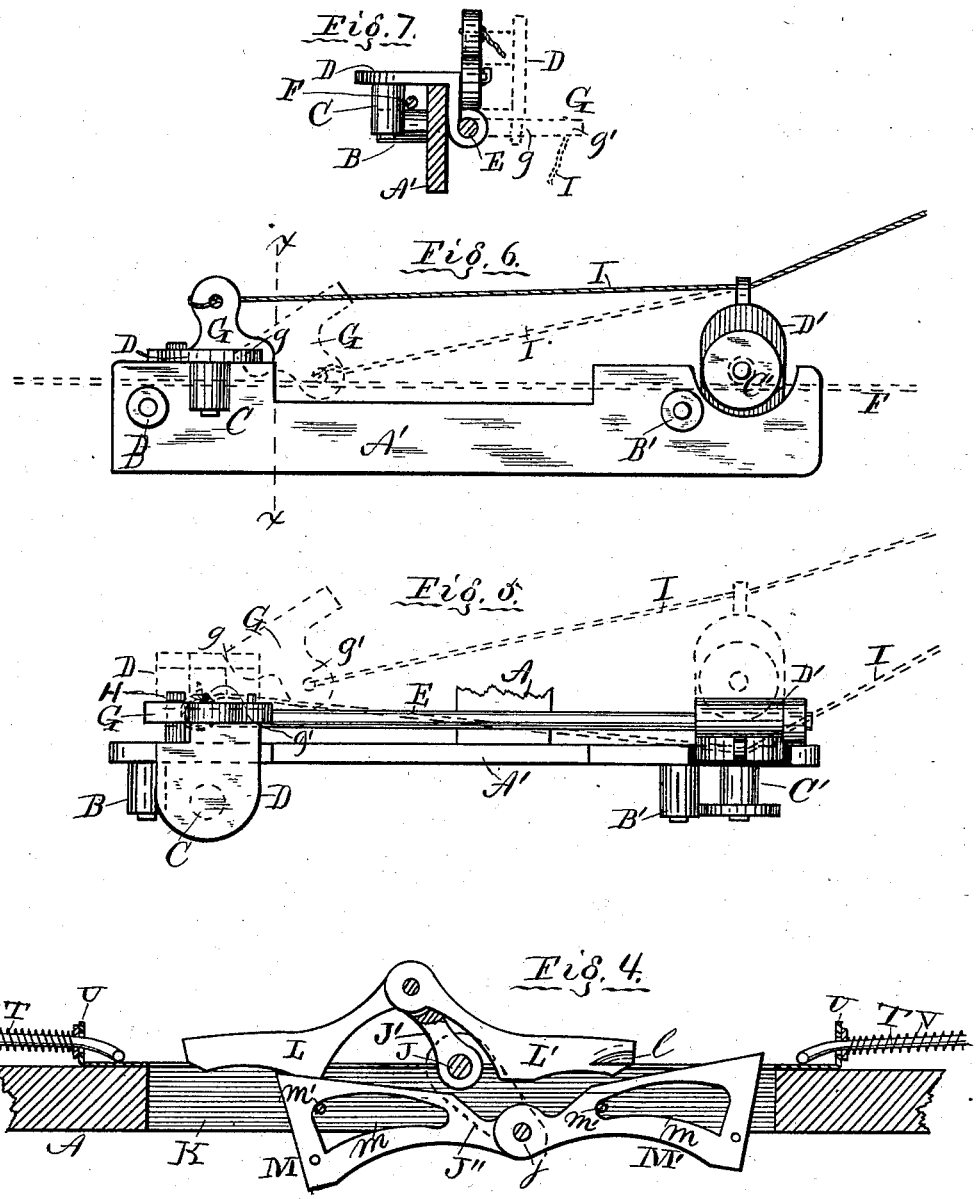

JOSEPH HARVEY, OF ALEDO, ILLINOIS.

CORN-PLANTER CHECK-ROWER.

SPECIFICATION forming part of Letters Patent No. 268,097, dated November 28, 1882.

Application filed March 2, 1882. (Model.)

*To all whom it may concern:*

Be it known that I, JOSEPH HARVEY, a citizen of the United States, residing at Aledo, in the county of Mercer and State of Illinois, have invented certain new and useful Improvements in Corn-Planter Check-Rowers; and I do hereby declare the following to be a full, clear, and exact description of the invention, such as will enable others skilled in the art to which it appertains to make and use the same.

This invention relates to corn-planter check-rowers of that class in which the planter is drawn across the ground to be planted in contact with a wire or rope having buttons or tappets at intervals, adapted to move an oscillating forked lever or other device from which movement is transmitted to the seed-slides, and more particularly to that class of such check-rowers in which the forked levers or sliding arms acted on by the tappet-wire move in horizontal planes; and the invention consists, first, in improvements in the construction and combination of devices for transmitting movement from the forked lever to the seed-slides; and, second, in the construction and combination of devices for guiding the tappet-wire in contact with the check-rower, and in freeing it therefrom, all as hereinafter described, and set forth in the claims hereto annexed.

In the accompanying drawings, which illustrate a construction embodying my invention, and which form a part of this specification, Figure 1 is a top plan. Fig. 2 is an enlarged elevation of the rear side and central parts of Fig. 1. Fig. 3 is an enlarged sectional elevation in the line $xx$ in Fig. 1. Fig. 4 is same elevation as Fig. 3, but the parts in different relative positions from positions shown at Fig. 3. Fig. 5 is an enlarged top plan of one end of Fig. 1. Fig. 6 is a side elevation of parts shown at Fig. 5. Fig. 7 is a sectional elevation in line $xx$ in Fig. 6.

The same symbol hereinafter used as a representative of any particular part, whether said symbol is an accented or an unaccented letter, is also used as a mark of reference to designate the same part in the different figures of the drawings.

Letter A represents a bar, to which the check-row devices are attached. The bar A may be placed transversely on the planter, so that a set of the devices at each end of said bar will be on each side of the planter, for the ordinary alternate connections with the tappet-wire, as the planter is to move in opposite directions across the field to be planted. The devices being similar at each end of the bar A, but one set need be herein described.

A′ are cross-heads, one on each end of bar A.

B B′ are pulleys projecting laterally from head A′. The pulleys B may be grooved, if desired, in the ordinary manner; but I prefer them with sides parallel with their axes, as shown.

C C′ are pulleys secured to plates D D′, respectively, which plates are secured to a rock-shaft, E, which is journaled in standards $e$, that project from bar or head A′. The pulleys C C′ may be formed as plain cylinders, like C, or with a flange, $d$, at their outer ends, like C′. The pulleys C C′ are preferably located, as shown, one in rear of each pulley B B′, in which positions they will serve to retain the tappet-wire F in its proper place on said pulleys B B′, as shown at Figs. 1, 6, and 7.

G is a latch, pivoted at $g$ to the plate D, so that it may engage with a catch, H, when in position shown by full lines in the drawings. An arm, $g'$, projects from the heel of the latch G, and to this arm is attached a cord, I, which extends rearward through a hole in the upper extended end of the plate D′, and thence to any point of fastening near the driver's seat. By drawing on the cord I the latch G (which holds the rock-shaft E) will first be tilted and released from its catch, as shown by dotted lines at Fig. 6, and then by further pulling on the cord the rock-shaft E will be turned and the pulleys C C′ thereby turned upward, as shown by dotted lines at Fig. 7, and thus allow the tappet-wire to escape from the pulleys B B′ when the planter has reached the end of the row, and the tappet-wire requires removal before the planter is turned around to begin a return row. The side tension on the tappet-wire, as it is placed with reference to the planter, will always insure its being drawn off the pulleys B B′ when the pulleys C C′ are raised, as described.

J is a short rock-shaft, journaled on and transversely to the bar A at the mid-length of said bar, from which shaft arms J′ J″ project in opposite directions, and together form a head, J'''.

K is a vertical slot lengthwise in the bar A.

L L' are similar arms, hinged to and projecting in opposite directions from the upper end of the arm J'. The arms L L' are formed as shown, and have side flanges, l, which slide on the bar A and retain the free ends of said bars always above the bar A. There are two arms J'', one on each side of the bar A, and connected at their lower ends by a shaft, j.

M M' are arms projecting in opposite directions from the shaft j. The arms M M' are located in the slot K, and each has a curved slot, m, therein, as shown at Figs. 3 and 4. Pins m' extend across the slot K and through each slot m. A slotted bar, N, is held by a set-screw, n, to one of the bars J'', and the bar N has a stud, n', which rests in the forked end of a bar, P, that is carried on a bar, Q, which slides in ways R. The bar P has a rod, p, connected with its lower end, which rod extends to the ordinary bar that connects the seed-slides of the planter, so that oscillating the head J''' will actuate the planter seed-slides. The bar N may be adjusted lengthwise on the bar J'' by a set-screw, n, to regulate the extent of throw of the seed-slides. If desired, the bars P and Q may be dispensed with and the stud on the bar N connected directly with the rod p.

S is a bent lever, forked at its outer end in the ordinary manner and journaled at s to the bar A. A sliding rod, T, is hinged at one end to the inner end of the lever S, and extends through a guide-standard, U, and has its free end t bent at right angles to its main portion, as shown. A spiral spring, V, encircles the rod T, and is secured at one end to a fixed collar, v, and its other end to a sliding collar, v'. The lever S is forced back in the direction of the arrow shown at Fig. 1 by the ordinary action of the tappets f on the wire F, and in thus moving slides the rod T toward the arms L M. When a tappet escapes from the forked lever the spring V will retract the sliding rod T and return said lever to its normal position and into position ready for the action of the next tappet on the wire F. Supposing the parts to be in the positions shown at Fig. 3, then the advance of the sliding-rod head t will act on the arm M and force it rearward and give an impulse to the seed-slides, and at the same time bring the arm L forward into the position shown at Fig. 4. The spring having retracted the head t, the curved slot m will allow the arm M to drop, as shown at Fig. 4, so that it will not interfere with the next movement of head t, as it now forces the arm L backward, gives a movement to the seed-slides, and brings the arm M again forward and ready for another movement, as already described. The arm M, in making the movement last described, is elevated at its free end, as shown at Fig. 3, by the upper side of its curved slot m sliding on the pin m'. The action of the sliding rod T at the other end of the bar A on the arms L' M' will be obvious from the foregoing description.

I desire in this specification to distinctly disclaim any invention or device in which it is necessary to tilt or turn down the pulleys on which the tappet-wire rests in operation, in order to free said wire or doff it from said pulleys, my invention relating, as hereinbefore described, to a check-rower in which, when the upper or wire-retaining pulleys or equivalents are turned upward, the side draft and tension of said wire will doff it or free it from the lower or main guide-pulleys.

What I claim as new is—

1. In a corn-planter check-rower, in combination with a sliding rod, T, arms L M, hinged to an oscillating head, J''', and the arm M having a curved slot, m, which slides on a pin, m', and raises said arm as it comes into position for the action of the sliding rod, substantially as and for the purpose specified.

2. In combination with a rocking head, J''', arms L M, arranged one above the other, and the lower one adapted to slide in a slot in the bar A, and to be raised and lowered by a pin, m', which rests in a slot, m, in said arm, substantially as and for the purpose specified.

3. In combination with the rocking head J''' and arms L M, located one above the other, and adapted to receive movement from the sliding rod T, substantially as described, the adjustable slotted bar N, for regulating the throw of the seed-slides, substantially as and for the purpose specified.

4. In combination with the rocking head J''', arms L M, located one above the other, and bar N, the slide-bar Q and forked bar P, substantially as and for the purpose specified.

5. In combination with the bent forked lever, spring-retracted sliding rod T, and arms L M, located one above the other, the rocking head J''', connected with the seed-slides by suitable means for operating them, substantially as and for the purpose specified.

6. In combination with the rocking head J''' and means for connecting same with the seed-slides, the arm L, hinged thereto and having side lug, l, and the arm M, hinged thereto and having curved slot m, sliding on pin m', and the sliding rod T, adapted to act alternately on the arms L M, substantially as and for the purpose specified.

7. In combination with the tappet-wire and horizontal guide-pulleys, adapted to allow said tappet-wire to slide off said pulleys without tilting them, the hinged pulleys adapted to be turned upward to permit the tappet-wire sliding off the guide-pulleys, substantially as and for the purpose specified.

8. In combination with the tappet-wire and guide-pulleys adapted to allow the tappet-wire to slide off said pulleys by side draft on said wire, the pulleys C C', attached to a rock-shaft, E, whereby they may be both turned upwardly to permit the tappet-wire to slide off the guide-pulleys, substantially as and for the purpose specified.

9. In combination with a tappet-wire, horizontal guide-pulleys, and forked lever oscillating in a horizontal plane, the hinged pulleys adapted to swing upwardly to allow the tappet-wire to escape from the forked lever and from the guide-pulleys, substantially as and for the purpose specified.

10. In combination with the guide-pulleys and hinged pulleys, a latch adapted to engage automatically with a catch to hold said hinged pulleys in position to retain the tappet-wire on the guide-pulleys, and further adapted to be released from the catch to permit swinging the hinged pulleys upwardly, substantially as and for the purpose specified.

11. In combination with the guide-pulleys and hinged pulleys, a latch and cord connected with said hinged pulleys, and adapted to be drawn, first to release the latch, and further drawn to swing the pulleys upwardly, substantially as and for the purpose specified.

In testimony whereof I affix my signature in presence of two witnesses.

JOSEPH HARVEY.

Witnesses:
　HARRY M. RICHARDS,
　SAML. N. GROSE.